United States Patent [19]
Stratton

[11] 3,742,503
[45] June 26, 1973

[54] AIR TRAFFIC CONTROL SYSTEMS

[75] Inventor: Andrew Stratton, Farnborough, England

[73] Assignee: The Secretary of State for Defence in Her Britannic Majesty's Government of the United Kingdom of Great Britain and Northern Ireland, London, England

[22] Filed: May 19, 1971

[21] Appl. No.: 144,838

[30] Foreign Application Priority Data
May 20, 1970 Great Britain................... 24,413/70

[52] U.S. Cl........................ 343/112 TC, 343/112 S
[51] Int. Cl............................................... G08g 5/00
[58] Field of Search ................. 343/112 TC, 112 S, 343/112 D; 235/150.27; 244/77 D

[56] References Cited
UNITED STATES PATENTS
3,336,591 8/1967 Michnik et al...................... 343/6.5

Primary Examiner—Robert F. Stahl
Assistant Examiner—Denis H. McCabe
Attorney—Hall, Pollock & Vande Sande

[57] ABSTRACT

An air traffic headway control system comprises a ground transmitter located en route and a receiver in each aircraft. The transmitter transmits cyclic sequences of distinctive signals whose timing is controlled by a highly stable master oscillator. These are received in the aircraft which also has a stable oscillator synchronized to the master oscillator of the transmitter.

Reference pulses which are timed with respect to the stable oscillator are generated in the receiver and a comparison is made between the timing of the reference pulses and the time of reception of the sequences of distinctive signals to provide an indication of the position of the aircraft in the lane. A perturbation is applied to the timing of the beginning of each sequence which represents the desired motion of the aircraft. The receiver also includes means for controlling the speed of the aircraft in accordance with its indicated position so as to maintain or correct its position. The means for making the comparison in timing preferably includes a correlation detector.

6 Claims, 3 Drawing Figures

AIR TRAFFIC CONTROL SYSTEMS

BACKGROUND OF THE INVENTION

The present invention relates to air traffic control systems. It is common practice for air traffic to follow predetermined routes especially when approaching or leaving an airport. It is clearly desirable that the air traffic on a regular route should be controlled to preserve a safe separation between aircraft, and avoid overtaking situations. At present this is done entirely by human monitoring and verbal instructions sent by radio to the pilots, which places a severe responsibility on the air traffic controllers.

It is an object of the invention to provide a system for controlling the progress of aircraft along a predetermined route and thereby assisting to maintain more accurately a desired minimum safe longitudinal separation, or headway, between aircraft following the same route, with the aim of reducing the burden of air traffic controllers and allowing the maximum safe air traffic density.

SUMMARY OF THE INVENTION

The main features of the new system may be stated as follows:

The system includes a transmitter, situated on the ground preferably in line with the air route, and receiver apparatus in each aircraft equipped to use the system. The transmitter includes a master oscillator and means for transmitting a series of distinctive signals in cyclic sequences at times determined with reference to the master oscillator. The receiver apparatus required for each aircraft will include a stable oscillator, means for receiving the distinctive signals, means for generating reference pulses at times determined with reference to the stable oscillator, and comparison means for measuring differences in timing between the reference pulses and the reception of the distinctive signals. The receiver apparatus should also include means for maintaining the stable oscillator in synchronism with the master oscillator in the transmitter. The system must also include means for applying a perturbation to the timing of either the signals transmitted by the transmitter or the reference pulses generated in the receiver apparatus so that the magnitude and sense of the perturbation is related to the desired motion of the aircraft. For reasons of economy, integrity and reliability, it is preferred that the perturbation means should form part of the transmitter apparatus and should be connected to apply a perturbation to the transmitter signals. It is intended that the speed of the aircraft and its progress along the route should be controlled either manually or automatically in accordance with the output of the comparison means.

Each of the sequences of distinctive signals provided by the transmitter must begin with a distinctive characteristic, and may include a plurality of transitions at which some distinctive characteristic of the signals is altered. That is to say, each sequence must have a recognizable beginning, and a plurality of recognizable subdivisions, which can be detected on reception. The distinctive characteristics concerned may for instance, be modulations of distinctive frequencies. For instance, the beginning of each sequence may be indicated by a period of modulation by a frequency $f_o$, and a typical transition may be indicated by a change in modulation from a frequency $f_1$ to another frequency $f_2$.

The master oscillator, and the stable oscillator in each receiver apparatus, are preferably connected to counter circuits so as to provide synchronized clock pulse trains of recurrence period substantially equal to the total duration of one of the cyclic sequences of distinctive signals. When the perturbation is zero, the transmission of the beginning of a sequence is also synchronized with the pulses of these clock pulse trains. The receiver apparatus is preferably arranged to measure the time delay $t_d$ between a pulse of its clock pulse train and the reception of the beginning of a sequence, and to generate a reference pulse centered on a time $t_d$ after the reception of the beginning of a sequence.

BRIEF DESCRIPTION OF THE DRAWINGS

An embodiment of the invention, comprising a system for the guidance of aircraft approaching a ground station, will now be described by way of example only, with reference to the accompanying drawings of which.

DESCRIPTION OF THE PREFERRED EMBODIMENTS

Figure 1:
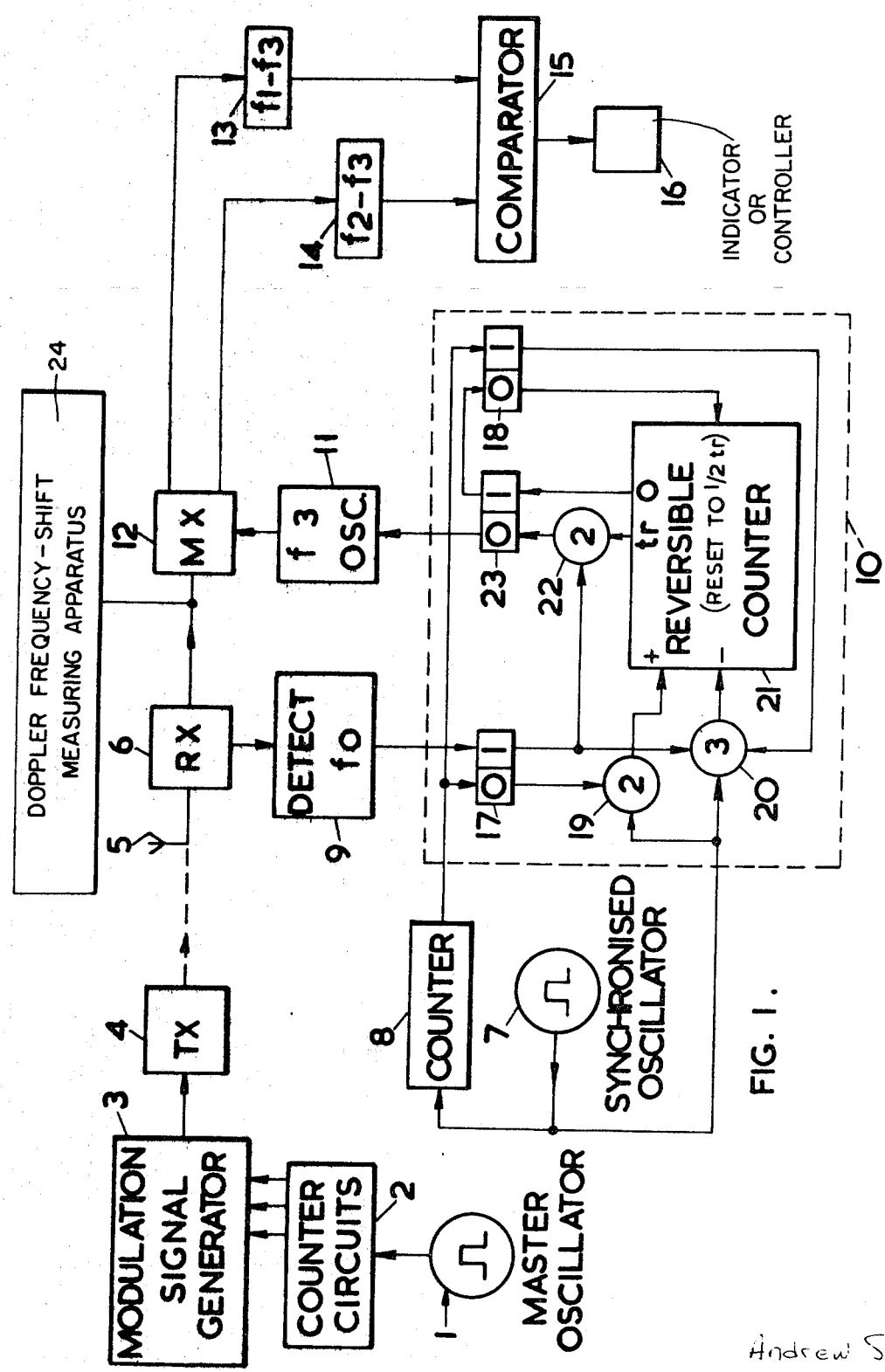
FIG. 1 is a schematic circuit diagram of the transmitter apparatus and a typical receiver apparatus of the system.

FIG. 1 shows transmitter apparatus comprising a master oscillator 1, connected to drive counter circuits 2 which control modulation signal generator circuits 3, and a transmitter 4 connected to transmit signals modulated by the output of the modulation signal generator circuits 3.

Also shown in FIG. 1 is a typical set of receiver apparatus including an aerial 5, a radio receiver 6, a stable oscillator 7, and a counter circuit 8 connected to the oscillator 7, with other circuits which will be described hereinafter.

Arrangements (not shown) are also provided for keeping the oscillators 1 and 7 accurately synchronized with each other. Arrangements for synchronizing oscillators are well known in the art and may, for instance, be provided as described by I M Hunter in an article in the Journal of the Institute of Navigation, volume 22, beginning on page 464 (1969).

Figure 2:
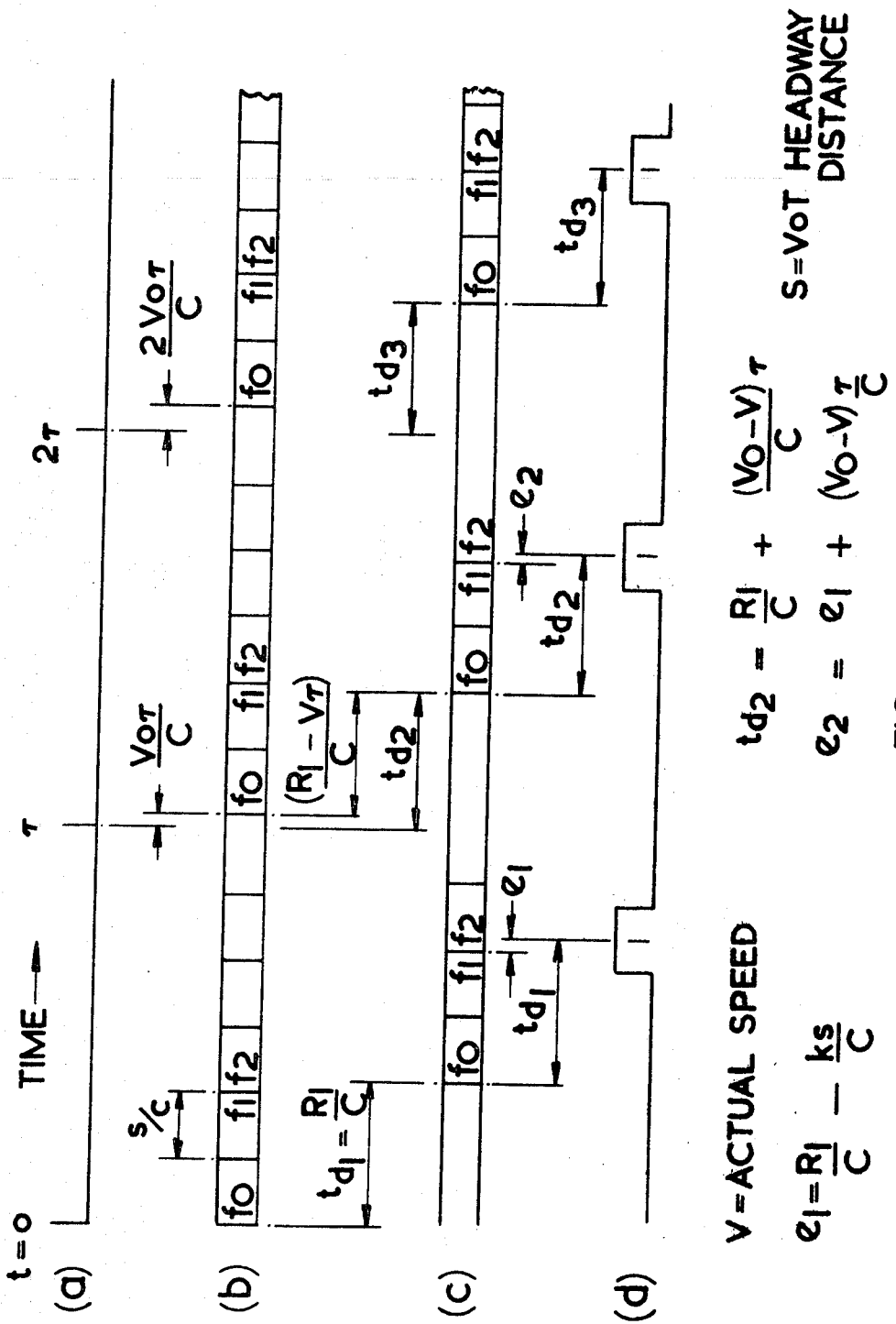
FIGS. 2 and 3 are graphical diagrams, showing the relationships of various signals in the system, assuming that the aircraft are intended to approach with uniform speed and equal separations.

FIG. 2 illustrates the relationships between various signals in the system of FIG. 1, by waveforms drawn to a common horizontal time scale. Some of the features shown on FIGS. 2 and 3 have been drawn out of proportion for the sake of clarity; hence these drawings should be taken as diagrammatic or qualitative representations only.

Figure 3:
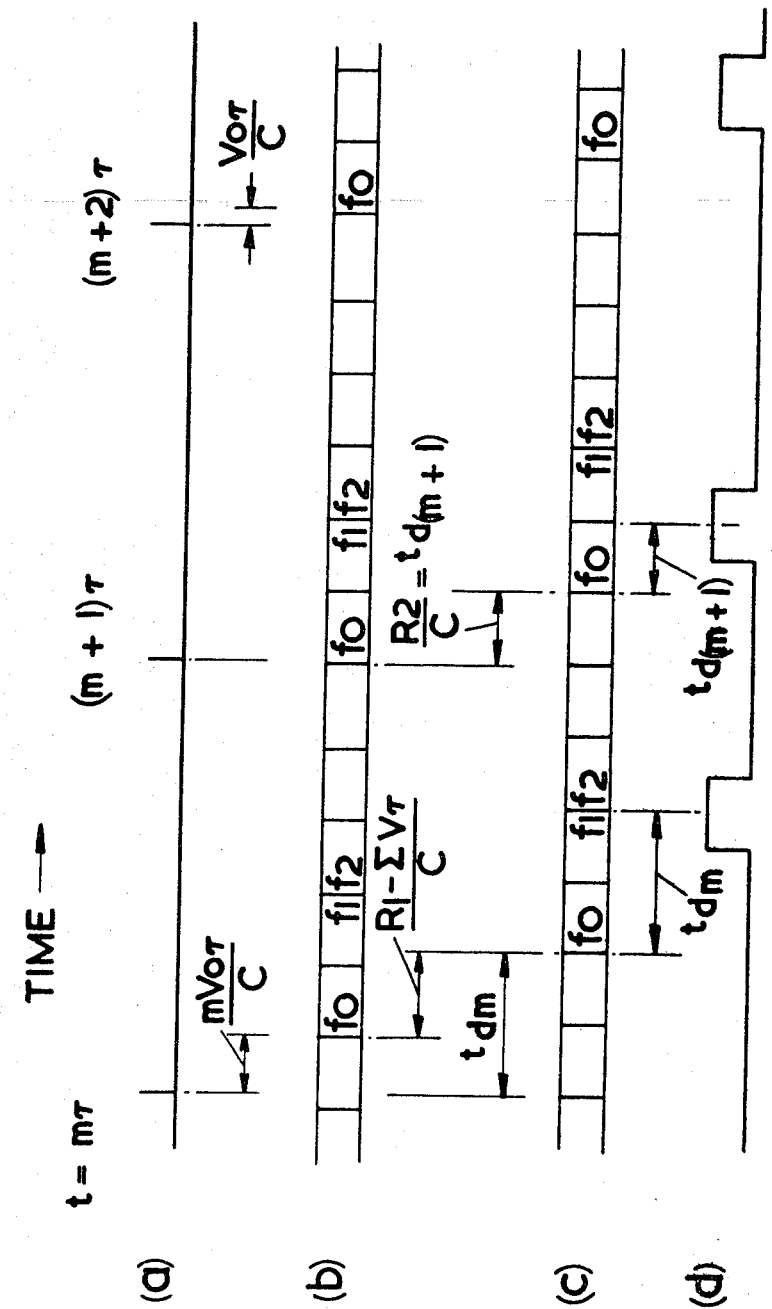

The waveform (a) in FIGS. 2 and 3 represents synchronized clock pulse trains derived by the counter circuits 2 and 8 from the oscillators 1 and 7 respectively. Since these clock pulse trains are identical and synchronized they can be represented by a single waveform.

Sequences of distinctive signals transmitted by the transmitter 4 are represented at (b) in FIGS. 2 and 3. Two complete sequences are shown, each beginning with a period of modulation at a frequency $f_0$. The sequences are subdivided by transitions, that is to say instants when the modulation is changed, represented on the drawings by vertical bars. The references $f_1$ and $f_2$ indicate the modulation frequencies transmitted respectively before and after a typical transition. The transitions are equispaced, S/C apart in time where S is the desired minimum longitudinal aircraft separation (headway distance) and C is the speed of propagation of radio waves.

FIG. 2 shows the signals starting from a time $t = 0$ when the perturbation applied to the timing of the transmitter signals is zero; hence the first sequence of transmitter signals shown begins in synchronism with a pulse of the clock pulse trains (a). The second sequence is delayed by a perturbation $V_O\tau/C$ where $V_o$ is the desired approach speed for aircraft in the system, $\tau$ is the period of the clock pulse trains (substantially equal to the total duration of each sequence), and C is the speed of propagation of radio waves. The perturbation applied to successive cycles is increased by $V_O\tau/C$ each cycle until, after many cycles, it reaches a total delay of S/C, when it is reduced to zero again. FIG. 3 illustrates the action of the system when this resetting occurs.

The relative timing of the signals when received in an aircraft, initially at a range $R_1$ from the transmitter, is represented at (c) in FIG. 2. Referring again to FIG. 1, the receiver 6 has an output connected to an $f_0$ detector circuit 9. This circuit 9 provides an output in response to the arrival and reception of the $f_0$ modulation which marks the beginning of a sequence. Its output, and signals from the oscillator 7 and counter 8, are applied to a reference pulse generator circuit 10. The reference pulse generator circuit 10 in effect measures the time delay $t_d$ between a pulse of the clock pulse train and the reception of the beginning of a sequence, and then generates a reference pulse centered on a time $t_d$ after the arrival of the beginning of the sequence. The reference pulses are shown at (d) in FIGS. 2 and 3. The details shown in FIG. 1 represent one possible arrangement of bistable circuits (17, 18, 23), gate circuits (19, 20, 22) and a reversible counter (21), which may be used to perform the function of the circuit 10.

The counter 8 produces the pulses of the train (a). Each of these pulses primes the pulse generating circuit 10 by setting the bistable circuits 17 and 18 appropriately. The setting of the bistable circuit 17 opens the gate 19 allowing pulses from the oscillator 7 to pass to a positive incrementing input of the reversible counter 21. In each cycle the counter 21 starts from a count of ½$tr$, where $tr$ is the number of pulses produced by the oscillator 7 in the duration of a reference pulse.

The count continues until the distinctive signal $f_0$ is received. At that instant the counter 21 will have reached a count equal to D + ½ $tr$ where D is the number of pulses produced by the stable oscillator 7 in the time interval $t_d$. Then the $f_0$ detector circuit 9 resets the bistable circuit 17 which closes the gate 19 and opens the gate 20; this reverses the direction of counting of the counter 21 which then starts to count down towards zero.

When the reversible counter 21 reaches a count of $tr$ the bistable circuit 23 is set by an output from the reversible counter. This output is supplied via the AND-gate 22 and because that gate has another input which is connected to the bistable circuit 17 the bistable circuit 23 can only be set after the reception of the $f_0$ signal. This setting of the bistable circuit 23 initiates the reference pulse (d). When the reversible counter 21 reaches a count of zero it resets the bistable circuit 23 and thus each reference pulse has a duration of $tr$. The bistable circuit 18 is reset by the bistable circuit 23 at the end of the reference pulse period. One output of the bistable circuit 18 then resets the counter in the reversible counter 21 to ½$tr$ while the other output inhibits the AND-gate 20. The whole cycle of events repeats itself on the occurrence of the next clock pulse of the train (a).

The capacity of the counter 21 must exceed ½$tr$ plus the number of pulses produced by the oscillator 7 in the maximum delay time $s/c$.

Using similar techniques, ordinary persons skilled in the art will readily be able to devise combinations of counter circuits, bistable circuits and gates to perform the function of the counter circuits 2 of FIG. 1, that is to control the formation of the transmitter signal sequences and the perturbations applied to them, so that they will occur as hereinbefore described with reference to FIG. 2. For instance, a counter in the circuit 2 can be used to time the required delay periods by counting oscillator pulses from an appropriate count down to zero, just as the counter 21 is used to determine the times $t_d$ at (d) in FIGS. 2 and 3. From the representations at (a) in FIGS. 2 and 3 it is clear that the timing of each delay period must start from the occurrence of a clock pulse, which should be arranged to start the count-down. When the count reaches zero, it should initiate the transmission of the prescribed sequence of signals, and the counter must be reset to a count corresponding to the next delay period required. As the required delay periods shown in FIGS. 2 and 3 form an arithmetical progression, the appropriate counts for resetting the counter can be generated by cumulative addition.

The preferred means for measuring differences in timing between the reference pulses and the transitions of the received signals is by a form of correlation detection, analogous to that used in the correlation-protected instrument landing system (CPILS) which is described in UK Pat. No. 1,088,957. In this arrangement, the reference pulses produced by the circuit 10 are used to control the output of a local oscillator 11, which produces signals of frequency $f_3$ for the duration of each reference pulse. Outputs from the oscillator 11 and receiver 6 are applied to a multiplicative mixer 12, which derives signals at the beat frequencies between the frequency $f_3$ and the frequencies of the modulations on the transmitter signals. The beat frequencies are passed through separate filters 13, 14 to the inputs of a comparator circuit 15, which detects the beat-frequency signals and produces an output representing the difference between their integrated values in magnitude and sign. This output is applied to an indicator or velocity controller 16; the speed of the aircraft should then be controlled to minimize the output of the comparator 15, either by an autopilot control or manually by the pilot. Assuming that this control will be substantially achieved, so that the $f_1$ to $f_2$ transition is always received simultaneously with the center of a reference pulse, the resultant effect of the system will be that the aircraft follows a given transition and approaches with the desired speed and separation from other aircraft allocated to follow other transitions.

The relevant mathematical relationships are indicated on FIGS. 2 and 3, where $R_1$ indicates the range of the aircraft concerned from the transmitter station, at the time $t = 0$. Each clock pulse at the transmitter occurs simultaneously with a clock pulse in the aircraft's receiver. In the transmitter the first clock pulse initiates a signal sequence which starts by transmitting the modulation frequency $f_0$. In the receiver the corresponding clock pulse starts the counter counting upwards from $\frac{1}{2}tr$. The first signals modulated at $f_0$ take a time $td_1 = R_1/C$ to reach the aircraft, where their detection reverses the counting. Since the transitions are equispaced in time $s/c$ apart, the kth transition is received at a time $ks/c$ later than the first $f_0$ signal. The count in the counter 10 again reaches its initial value, $\frac{1}{2}tr$, at a time $t_{d1}$ after the count was reversed, that is to say $t_{d1}$ after the reception of the first $f_0$ signals. This count corresponds to the center of a reference pulse, which begins at a count of $tr$ and ends at a count of zero. It follows that the error signal $e_1$ in this first sequence will be equal to $(R_1 - ks/C)$. Hence at this time $t = 0$ different aircraft following transitions associated with different integral values of $k$ and controlled to minimize the timing difference or error $e_1$ should be approximately at ranges which are integral multiples of the desired separation S.

During the first sequence the aircraft will have come a distance $V\tau$ nearer to the transmitter, so that the transmitter signals in the second sequence will be a shorter time in transit; however, they are emitted at a time $Vo\tau/C$ later with respect to the clock pulses by the timing perturbation applied at the transmitter. These two factors tend to compensate each other; the error signal in the second sequence will be $e_2 = e_1 + (Vo - V)\tau/C$. Controlling the aircraft speed so as to minimize the error signal in successive sequences will therefore control the progress of the aircraft so that its average speed tends to the desired speed Vo and so that whenever the perturbation returns to zero the aircraft's range from the transmitter will be an integral multiple of the desired separation S. During a complete perturbation cycle which takes a time $T = (m + 1)\tau$ where m is an integer, the aircraft travels a distance $s = VoT$ nearer to the transmitter. At the end of a perturbation cycle, when the perturbation is reset to zero, an aircraft previously following the kth transition will be automatically switched to follow the $(k - 1)$th transition. This action is shown in FIG. 3. In practice, the sequences may include any convenient number of transitions, and an air traffic controller should ensure that only one aircraft is allowed to start following any given transition. Once the allocation is made, the aircraft should use the system with its velocity controlled according to the signals provided by the comparator circuit 15.

Other embodiments and modifications of the invention will now be obvious to persons skilled in the art. For instance, the system may be modified for controlling aircraft flying away from the beacon if the sign of the perturbation is changed, so that successive transmission sequences are progressively advanced with respect to the clock pulse trains. If a controlled non-linear variation of velocity with range is desired, it can be provided by making the intervals between transitions unequal and applying suitably different perturbations to each transition. This may be useful if it is required to use a non-linear flight path or a transmitter site offset from the flight path, or if it is desired to allow aircraft to join the system with a comparatively wide separation and comparatively high speed and to decrease their speed and separation as they approach, under the guidance of the system. This is possible because the position of the transitions in the sequence is related to the range from the transmitter of the aircraft following them; the first transition is being followed by the nearest aircraft, and later transitions are being followed by aircraft further away. Hence the transitions can be unequally separated and differently perturbed, so that the earlier transitions have shorter separations and are given comparatively small perturbations corresponding to a low speed, while the later transitions are further apart and subject to larger perturbations corresponding to a higher speed.

To assist the pilot and air traffic controller and confirm the allocations of aircraft to appropriate transitions, additional signals may be sent between the aircraft and the transmitter. For instance a distinct signal may be sent concurrently with any transition to indicate the aircraft allocated to follow that transition, for instance by its call-sign. The error signals derived by the comparator 15 in each receiver apparatus may be transmitted to the air traffic control station for surveillance purposes.

Amplification at an intermediate frequency can be arranged in the receiver as is well known in the art.

An apparatus 24 may also be connected to an output of the receiver 6 or the mixer 12, for measuring the Doppler frequency shift on the received signals and thereby deriving a signal representing the actual speed of the aircraft, which can be used advantageously in conjunction with the output of the comparator 15 to control the speed and progress of the aircraft in a smooth and stable manner. The apparatus may be arranged to compensate for the Doppler frequency shift and effectively eliminate it from the signals applied to the filters 13 and 14. To assist the accurate measurement of the Doppler frequency shift, an additional reference signal may be transmitted in another channel, in time-division or frequency-division multiplex with the basic signals of the system hereinbefore described.

The system could also be made to work if the time delay between the reception of the $f_o$ signal and the center of the reference pulse is made proportional to, instead of equal to, the measured time delayed between the occurrence of a clock and the reception of the $f_o$ signal, if the time between consecutive transitions ($s/c$ in FIGS. 2 and 3) is altered by a similar factor. It appears that a constant offset in the timing of the reference pulses may also be non-critical.

In some embodiments of the invention the time $V_o\tau/C$ may be too short for convenient or accurate measurement. In such cases the perturbation may be incremented by the smallest convenient increment after every nth sequence, where n is an integer chosen so that the average rate of increase of the perturbation is equal to $V_o\tau/C$ per sequence.

I claim:

1. An air traffic headway control system comprising; transmitter apparatus at a fixed ground station, said transmitter apparatus including a first stable oscillator and means for transmitting cyclic sequences of distinctive signals at times determined with respect to the first stable oscillator, each sequence beginning with a predetermined, distinctive signal and comprising a plurality of distinctive signal transitions in a predetermined sequence; receiver apparatus in each aircraft using the system, said receiver apparatus including a second stable oscillator, means for receiving the said sequences of distinctive signals, means for generating reference pulses at times determined with respect to the second stable oscillator, and comparison means for measuring differences between the timing of the reference pulses and the time of reception of a transition in each of the said sequences of distinctive signals; and perturbation means in one of said transmitter and receiver apparatus for causing displacements in the relative timing of the transmitted signals and the receiver reference pulses, said perturbation means including means operative to increase said displacements in successive sequences in a predetermined manner related to the desired progress of the aircraft, and for resetting and restarting said displacements from zero after a predetermined number of sequences.

2. Transmitter apparatus for an air traffic headway control system, including a first stable oscillator, means for transmitting cyclic sequences of distinctive signals at times determined with respect to the first stable oscillator, each sequence beginning with a predetermined distinctive signal and comprising a plurality of distinctive signal transitions in a predetermined sequence, and perturbation means for causing displacements in the timing, with respect to the first stable oscillator, of the beginning and the transitions of the sequences, said perturbation means including means operative to increase said displacements in successive sequences in a predetermined manner related to the desired progress of the aircraft and to reset and restart said displacements from a zero after a predetermined number of sequences.

3. Transmitter apparatus as claimed in claim 2 wherein the perturbation means is constructed to cause the said time displacements to be increased by like successive terms of an arithmetic progression, over a predetermined number of sequences.

4. Receiver apparatus for an air traffic headway control system, including a stable oscillator, receiver means for receiving signals transmitted from a ground station, means for measuring the time delay $t_d$ between the occurrence of a pulse at the output of the stable oscillator and the reception of a first distinctive signal from the ground station, means for generating a reference pulse at a time delayed, by a time dependent on the measured time $t_d$, after the reception of the said first distinctive signal, and means for deriving a control signal dependent on the timing relative to the reference pulse of the reception of a distinctive feature of the signals transmitted from the ground station and received by the receiver means.

5. Receiver apparatus as claimed in claim 4 and wherein the said means for deriving the control signal includes a local oscillator controlled by the reference pulses so that it oscillates for the duration of each reference pulse, a multiplicative signal mixer connected to mix the signal of the local oscillator with modulation components of selected ones of the received distinctive signals so as to derive beat frequency signals therefrom, and a comparison means connected to produce an output representing the difference in magnitude and sign between selected ones of the beat frequency signals.

6. Receiver apparatus as claimed in claim 5, and also including means for measuring the Doppler frequency shift in the received signals and deriving from it a signal representing the relative velocity of the aircraft.

* * * * *